US012209163B2

(12) United States Patent
Kim (10) Patent No.: US 12,209,163 B2
(45) Date of Patent: Jan. 28, 2025

(54) POLYMER COMPOSITION FOR USE IN A CAMERA MODULE (71) Applicant: Ticona LLC, Florence, KY (US)

(72) Inventor: Young Shin Kim, Cincinnati, OH (US)

(73) Assignee: Ticona LLC, Florence, KY (US)

( * ) Notice: Subject to any disclaimer, the term of this patent is extended or adjusted under 35 U.S.C. 154(b) by 120 days.

(21) Appl. No.: 17/726,590

(22) Filed: Apr. 22, 2022

(65) Prior Publication Data

US 2022/0363814 A1    Nov. 17, 2022

Related U.S. Application Data (60) Provisional application No. 63/191,384, filed on May 21, 2021, provisional application No. 63/184,819, filed on May 6, 2021.

(51) Int. Cl.
*C08G 63/06* (2006.01)
*C08K 3/36* (2006.01)
*C08K 7/18* (2006.01)
*G03B 13/36* (2021.01)
*G03B 17/02* (2021.01)

(52) U.S. Cl.
CPC ............... *C08G 63/06* (2013.01); *C08K 3/36* (2013.01); *C08K 7/18* (2013.01); *G03B 13/36* (2013.01); *G03B 17/02* (2013.01); *C08K 2201/005* (2013.01)

(58) Field of Classification Search
CPC ..... C08K 3/36; C08K 2201/005; C08G 63/06
See application file for complete search history.

(56) References Cited

U.S. PATENT DOCUMENTS

| 3,084,538 A | 4/1963 | Small et al. |
| 3,879,982 A | 4/1975 | Schmidt |
| 4,535,623 A | 8/1985 | Gilberto |
| 5,362,809 A | 11/1994 | Hallden-Abberton et al. |
| 5,492,946 A | 2/1996 | Huspeni et al. |
| 5,538,666 A | 7/1996 | Jin |

(Continued)

FOREIGN PATENT DOCUMENTS

| CN | 202583021 U | 12/2012 |
| CN | 101497795 B | 2/2013 |

(Continued)

OTHER PUBLICATIONS

Product Information—Hardness Test Rod 318/318A/318C from Erichsen USA, retrieved from the Internet on Mar. 28, 2023, 2 pages.

(Continued)

*Primary Examiner* — Noam Reisner
(74) *Attorney, Agent, or Firm* — Dority & Manning, P.A.

(57) ABSTRACT

A polymer composition that comprises from about 50 wt. % to about 90 wt. % of a polymer matrix and from about 10 wt. % to about 50 wt. % of silica particles is provided. The polymer matrix includes a liquid crystalline polymer containing repeating units derived from naphthenic hydroxycarboxylic and/or dicarboxylic acids in an amount of about 15 mol. % or less of the polymer. The silica particles have a median particle size of about 4 micrometers or less. The polymer composition exhibits a tensile modulus of 11,000 MPa or more as determined in accordance with ISO Test No. 527:2019.

30 Claims, 2 Drawing Sheets

(56) References Cited

U.S. PATENT DOCUMENTS

| | | | |
|---|---|---|---|
| 5,845,028 A | 12/1998 | Smith et al. | |
| 5,891,132 A | 4/1999 | Hohla | |
| 5,928,589 A | 7/1999 | Norota et al. | |
| 6,046,300 A | 4/2000 | Umetsu et al. | |
| 6,063,848 A | 5/2000 | Murakami et al. | |
| 6,153,121 A | 11/2000 | Makabe et al. | |
| 6,221,962 B1 | 4/2001 | Heino et al. | |
| 6,306,946 B1 | 10/2001 | Long et al. | |
| 6,461,732 B1 | 10/2002 | Wittmann et al. | |
| 6,495,616 B2 | 12/2002 | Maeda | |
| 6,680,002 B2 | 1/2004 | Yamauchi et al. | |
| 6,730,378 B2 | 5/2004 | Matsuoka et al. | |
| 6,733,691 B2 | 5/2004 | Nagano et al. | |
| 7,113,351 B2 | 9/2006 | Hovanky | |
| 7,166,238 B2 | 1/2007 | Kato et al. | |
| 7,189,778 B2 | 3/2007 | Tobita et al. | |
| 7,601,771 B2 | 10/2009 | Schmidt et al. | |
| 7,608,666 B2 | 10/2009 | Matsuoka et al. | |
| 7,612,130 B2 | 11/2009 | Kim | |
| 7,740,770 B2 | 6/2010 | Mizumoto et al. | |
| 7,776,410 B2 | 8/2010 | Nakane et al. | |
| 7,862,745 B2 | 1/2011 | Tano et al. | |
| 7,892,450 B2 | 2/2011 | Uchida et al. | |
| 7,960,473 B2 | 6/2011 | Kobayashi et al. | |
| 7,969,670 B2 | 6/2011 | Woo et al. | |
| 7,985,351 B2 | 7/2011 | Yamauchi et al. | |
| 8,066,907 B2 | 11/2011 | Kohinata et al. | |
| 8,086,099 B2 | 12/2011 | Schworm et al. | |
| 8,116,018 B2 | 2/2012 | Park et al. | |
| 8,142,683 B2 | 3/2012 | Murouchi et al. | |
| 8,192,645 B2 | 6/2012 | Murouchi et al. | |
| 8,202,448 B2 | 6/2012 | Fukuhara et al. | |
| 8,262,933 B2 | 9/2012 | Sekimura et al. | |
| 8,279,541 B2 | 10/2012 | Henderson et al. | |
| 8,324,307 B2 | 12/2012 | Harder et al. | |
| 8,432,484 B2 | 4/2013 | Christison | |
| 8,465,670 B2 | 6/2013 | Kondo et al. | |
| 8,545,719 B2 | 10/2013 | Komatsu et al. | |
| 8,641,924 B2 | 2/2014 | Sekimura et al. | |
| 8,646,994 B2 | 2/2014 | Kim et al. | |
| 8,658,057 B2 | 2/2014 | Nakayama et al. | |
| 8,696,932 B2 | 4/2014 | Uchida et al. | |
| 8,778,220 B2 | 7/2014 | Lee et al. | |
| 8,778,222 B2 | 7/2014 | Matsubara et al. | |
| 8,784,683 B2 | 7/2014 | Matsubara et al. | |
| 8,834,741 B2 | 9/2014 | Shiraishi et al. | |
| 8,906,259 B2 | 12/2014 | Kim | |
| 8,907,049 B2 | 12/2014 | Baidak et al. | |
| 8,926,862 B2 | 1/2015 | Kim et al. | |
| 8,932,483 B2 | 1/2015 | Kim | |
| 9,085,672 B2 | 7/2015 | Matsubara et al. | |
| 9,109,111 B2 | 8/2015 | Lee et al. | |
| 9,228,080 B2 | 1/2016 | Arpin | |
| 9,284,435 B2 | 3/2016 | Kim | |
| 9,355,753 B2 | 5/2016 | Kim | |
| 9,512,293 B2 | 12/2016 | Kim | |
| 9,641,732 B2 | 5/2017 | Yasukochi et al. | |
| 9,667,845 B2 | 5/2017 | Mirlay | |
| 9,822,254 B2 | 11/2017 | Kim | |
| 9,862,809 B2 | 1/2018 | Kim et al. | |
| 9,896,566 B2 | 2/2018 | Yung et al. | |
| 9,947,433 B2 | 4/2018 | Fujino et al. | |
| 9,988,519 B2 | 6/2018 | Kim | |
| 9,994,771 B2 | 6/2018 | Hegi | |
| 9,995,904 B2 | 6/2018 | Lee et al. | |
| 9,995,964 B2 | 6/2018 | Zhang et al. | |
| 10,106,682 B2 | 10/2018 | Kim | |
| 10,280,282 B2 | 5/2019 | Kim | |
| 10,287,421 B2 | 5/2019 | Kim | |
| 10,377,851 B2 | 8/2019 | Ishizu et al. | |
| 10,407,605 B2 | 9/2019 | Kim et al. | |
| 10,564,081 B2 | 2/2020 | Eversole et al. | |
| 10,633,538 B2 | 4/2020 | Stoppelmann | |
| 10,640,648 B2 | 5/2020 | Kim | |
| 10,654,970 B2 | 5/2020 | Matsubara et al. | |
| 10,767,049 B2 | 9/2020 | Kim | |
| 10,822,452 B2 | 11/2020 | Tsuchiya et al. | |
| 10,829,634 B2 | 11/2020 | Kim | |
| 10,941,275 B2 | 3/2021 | Kim | |
| 10,995,272 B2 | 5/2021 | Hara et al. | |
| 11,084,925 B2 | 8/2021 | Kim | |
| 11,086,200 B2 | 8/2021 | Kim | |
| 11,136,445 B2 | 10/2021 | Kim | |
| 11,174,342 B2 | 11/2021 | Hara et al. | |
| 11,208,556 B2 | 12/2021 | Kim | |
| 11,214,683 B2 | 1/2022 | Kim | |
| 11,294,141 B2 | 4/2022 | Kao et al. | |
| 11,485,851 B2 | 11/2022 | Hara | |
| 2002/0064701 A1 | 5/2002 | Hand et al. | |
| 2002/0172786 A1 | 11/2002 | Matsuoka et al. | |
| 2003/0096070 A1 | 5/2003 | Matsuoka et al. | |
| 2005/0077498 A1 | 4/2005 | Kato et al. | |
| 2005/0176835 A1 | 8/2005 | Kobayashi et al. | |
| 2005/0260361 A1 | 11/2005 | Alms et al. | |
| 2006/0009580 A1 | 1/2006 | Alms et al. | |
| 2006/0014876 A1 | 1/2006 | Bushelman et al. | |
| 2007/0057236 A1 | 3/2007 | Hosoda et al. | |
| 2007/0182059 A1 | 8/2007 | Ikegawa et al. | |
| 2007/0190346 A1 | 8/2007 | Ikegawa | |
| 2008/0048150 A1 | 2/2008 | Hosoda et al. | |
| 2011/0189454 A1 | 8/2011 | Fukuhara et al. | |
| 2011/0189455 A1 | 8/2011 | Fukuhara et al. | |
| 2012/0199790 A1 | 8/2012 | Yun et al. | |
| 2012/0218649 A1 | 8/2012 | Konishi et al. | |
| 2012/0232188 A1 | 9/2012 | Nakayama | |
| 2012/0251769 A1 | 10/2012 | Harada et al. | |
| 2012/0252955 A1 | 10/2012 | Sekmura et al. | |
| 2014/0316041 A1 | 10/2014 | Mehta | |
| 2015/0038631 A1 | 2/2015 | Hamaguchi et al. | |
| 2015/0104165 A1 | 4/2015 | Kim | |
| 2015/0112019 A1 | 4/2015 | Kim et al. | |
| 2015/0346390 A1 | 12/2015 | Nagura et al. | |
| 2018/0346641 A1 | 12/2018 | Hegi | |
| 2018/0346642 A1 | 12/2018 | Hegi | |
| 2019/0169427 A1* | 6/2019 | Kim | C08L 23/0884 |
| 2020/0165444 A1* | 5/2020 | Tachikawa | C08K 3/36 |
| 2020/0172669 A1 | 6/2020 | Song et al. | |
| 2020/0247996 A1 | 8/2020 | Kim | |
| 2020/0304694 A1 | 9/2020 | Kim | |
| 2020/0347303 A1 | 11/2020 | Pan et al. | |
| 2020/0362099 A1 | 11/2020 | Hara et al. | |
| 2020/0399465 A1 | 12/2020 | Hara | |
| 2021/0061992 A1* | 3/2021 | Tanaka | C08K 3/36 |
| 2021/0061994 A1 | 3/2021 | Kim | |
| 2021/0189095 A1 | 6/2021 | Kim | |
| 2021/0341820 A1 | 11/2021 | Kim | |
| 2022/0025153 A1 | 1/2022 | Kim | |
| 2022/0098410 A1 | 3/2022 | Kim | |
| 2022/0112372 A1 | 4/2022 | Kim | |
| 2022/0243055 A1 | 8/2022 | Kim | |
| 2022/0266476 A1 | 8/2022 | Hara et al. | |

FOREIGN PATENT DOCUMENTS

| | | |
|---|---|---|
| CN | 102352259 B | 10/2013 |
| CN | 204332960 U | 5/2015 |
| CN | 104040422 B | 4/2016 |
| CN | 103360729 B | 5/2016 |
| CN | 106674938 A | 5/2017 |
| CN | 104341721 B | 7/2017 |
| CN | 104822775 B | 12/2017 |
| CN | 106380790 B | 1/2018 |
| CN | 105764988 B | 6/2018 |
| CN | 105907058 B | 6/2018 |
| CN | 105980479 B | 10/2018 |
| CN | 108350278 B | 7/2019 |
| CN | 108431138 B | 7/2019 |
| CN | 109790379 B | 4/2020 |
| CN | 111073224 A | 4/2020 |
| CN | 111087765 A | 5/2020 |
| CN | 111117170 A | 5/2020 |
| CN | 111138815 A | 5/2020 |
| CN | 109790378 B | 9/2020 |
| CN | 107924039 B | 10/2020 |

(56) References Cited

FOREIGN PATENT DOCUMENTS

| | | |
|---|---|---|
| CN | 111944278 A | 11/2020 |
| CN | 111989368 A | 11/2020 |
| EP | 2 774 952 B1 | 6/2019 |
| JP | 2000080289 A | 3/2000 |
| JP | 3111471 B2 | 11/2000 |
| JP | 2001026699 A | 1/2001 |
| JP | 3750232 B2 | 3/2006 |
| JP | 2006117731 A | 5/2006 |
| JP | 2007138143 A | 6/2007 |
| JP | 2007254716 A | 10/2007 |
| JP | 2007254717 A | 10/2007 |
| JP | 2009191088 A | 8/2009 |
| JP | 4600015 B2 | 12/2010 |
| JP | 4600016 B2 | 12/2010 |
| JP | 4625304 B2 | 2/2011 |
| JP | 4657565 B2 | 3/2011 |
| JP | 2011137064 A | 7/2011 |
| JP | 2012021147 A | 2/2012 |
| JP | 5088160 B2 | 12/2012 |
| JP | 5124932 B2 | 1/2013 |
| JP | 5132890 B2 | 1/2013 |
| JP | 5136324 B2 | 2/2013 |
| JP | 5256716 B2 | 8/2013 |
| JP | 5262138 B2 | 8/2013 |
| JP | 2013166848 A | 8/2013 |
| JP | 5396810 B2 | 1/2014 |
| JP | 5541330 B2 | 7/2014 |
| JP | 5742567 B2 | 7/2015 |
| JP | 2016124947 A | 7/2016 |
| JP | WO 2017/038421 A1 | 3/2017 |
| JP | 2017082158 A | 5/2017 |
| JP | WO 2017/110424 A1 | 6/2017 |
| JP | WO 2017/110646 A1 | 6/2017 |
| JP | 6164945 B2 | 7/2017 |
| JP | 6174406 B2 | 8/2017 |
| JP | 6190089 B1 | 8/2017 |
| JP | 2018012789 A | 1/2018 |
| JP | 6294690 B2 | 3/2018 |
| JP | 2018044108 A | 3/2018 |
| JP | WO 2018/066416 A1 | 4/2018 |
| JP | WO 2018/066417 A1 | 4/2018 |
| JP | WO 2018/074155 A1 | 4/2018 |
| JP | WO 2018/074156 A1 | 4/2018 |
| JP | 2018095683 A | 6/2018 |
| JP | 2018095684 A | 6/2018 |
| JP | 6359835 B2 | 7/2018 |
| JP | 2018106005 A | 7/2018 |
| JP | 6400690 B2 | 10/2018 |
| JP | 2018168207 A | 11/2018 |
| JP | 2019045607 A | 3/2019 |
| JP | WO 2019/054187 A1 | 3/2019 |
| JP | 6503272 B2 | 4/2019 |
| JP | 2019065263 A | 4/2019 |
| JP | WO 2019/065063 A1 | 4/2019 |
| JP | 6581659 B2 | 9/2019 |
| JP | WO 2019/203157 A1 | 10/2019 |
| JP | 2020029496 A | 2/2020 |
| JP | 2020029497 A | 2/2020 |
| JP | 2020164738 A | 10/2020 |
| JP | 6843675 B2 | 3/2021 |
| JP | 6844968 B2 | 3/2021 |
| JP | 2021038332 A | 3/2021 |
| JP | 2021059670 A | 4/2021 |
| JP | 6885687 B2 | 6/2021 |
| JP | 6892975 B1 | 6/2021 |
| JP | 2021098348 A | 7/2021 |
| KR | 20120059382 A | 6/2012 |
| KR | 20120136434 A | 12/2012 |
| KR | 20150011768 A | 2/2015 |
| KR | 101783505 B1 | 9/2017 |
| KR | 20200132709 A | 11/2020 |
| WO | WO 95/15360 A1 | 6/1995 |
| WO | WO 2013/129338 A1 | 9/2013 |
| WO | WO 2014/087842 A1 | 6/2014 |
| WO | WO 2015/083759 A1 | 6/2015 |
| WO | WO 2016/088714 A1 | 6/2016 |
| WO | WO 2017/023662 A1 | 2/2017 |
| WO | WO 2017/110866 A1 | 6/2017 |
| WO | WO 2017/110867 A1 | 6/2017 |
| WO | WO 2018/012371 A1 | 1/2018 |
| WO | WO 2020/071495 A1 | 4/2020 |

OTHER PUBLICATIONS

Certificate of Analysis of CR10-20 and SP60-05 from Nippon Steel Chemical & Material Co., Ltd. (Micron Div.), Aug. 19, 2019, 1 page.
Material Safety Data Sheet for Lotader® AX8840, Jul. 11, 2011, 8 pages.
Product Information—SPH507M from Nippon Steel Chemical & Material Co., Ltd., Micron Div., Jul. 29, 2020, 1 page.
Product Information for Kitamura PTFE Micropowder for Tribiology from Dreytek, Inc., 2 pages.
Product Information on Lotader® AX8840 from Arkema Functional Polyolefins, 2 pages.
Safety Data Sheet from Nippon Steel Chemical & Material Co., Ltd, Micron Div. for SPH507 (amorphous silica), Aug. 3, 2020, 7 pages.
Technical Data Sheet for Xydar® CM-721 B from Solvay Specialty Polymers USA, LLC, 1 page.
International Search Report and Written Opinion for PCT/US2022/026096 dated Jul. 28, 2022, 9 pages.

* cited by examiner

POLYMER COMPOSITION FOR USE IN A CAMERA MODULE

RELATED APPLICATIONS

The present application is based upon and claims priority to U.S. Provisional Patent Application Ser. No. 63/184,819, having a filing date of May 6, 2021; and U.S. Provisional Patent Application Ser. No. 63/191,384, having a filing date of May 21, 2021, which are incorporated herein by reference.

BACKGROUND OF THE INVENTION

Camera modules (or components) are often employed in mobile phones, laptop computers, digital cameras, digital video cameras, etc. Generally, the camera module includes a lens module and an image sensor for converting an image of an object into an electrical signal. The lens module may be disposed in a housing and include a lens barrel having one or more lenses disposed therein. In addition, the camera module may include an actuator assembly for optical image stabilization (OIS) to reduce resolution loss, or blurring, caused by hand-shake. The actuator assembly functions by moving the lens module to a target position after receiving a certain signal. To help ensure proper alignment of the lens module during movement, many actuator assemblies also include ball bearings that help guide the lens module in the desired direction. Conventionally, these ball bearings are formed from a ceramic material that is sufficiently strong to withstanding the forces exerted during use. While strong, the ball bearings can nevertheless cause "dents" to form on surfaces of the camera module, which create noise and impact performance.

As such, a need exists for a material that can exhibit better performance when employed in a camera module.

SUMMARY OF THE INVENTION

In accordance with one embodiment of the present invention, a polymer composition is disclosed that comprises from about 50 wt. % to about 90 wt. % of a polymer matrix that includes a liquid crystalline polymer containing repeating units derived from naphthenic hydroxycarboxylic and/or dicarboxylic acids in an amount of about 15 mol. % or less of the polymer. The polymer composition also comprises from about 10 wt. % to about 50 wt. % of silica particles distributed within the polymer matrix, wherein the silica particles have a median particle size of about 4 micrometers or less. The polymer composition exhibits a tensile modulus of 11,000 MPa or more as determined in accordance with ISO Test No. 527:2019.

Other features and aspects of the present invention are set forth in greater detail below.

BRIEF DESCRIPTION OF THE FIGURES

A full and enabling disclosure of the present invention, including the best mode thereof to one skilled in the art, is set forth more particularly in the remainder of the specification, including reference to the accompanying figures, in which.

DETAILED DESCRIPTION

It is to be understood by one of ordinary skill in the art that the present discussion is a description of exemplary embodiments only, and is not intended as limiting the broader aspects of the present invention.

Generally speaking, the present invention is directed to a polymer composition for use in a camera module. The polymer composition includes a plurality of silica particles distributed within a polymer matrix that includes a liquid crystalline polymer. By selectively controlling the specific nature of the silica particles and liquid crystalline polymer, as well as their relative concentration, the present inventor has discovered that the resulting composition can exhibit a unique combination of properties that enables it to more readily employed in a camera module. For example, the tensile modulus may be about 11,000 MPa or more, in some embodiments from about 12,000 MPa to about 30,000 MPa, in some embodiments from about 13,000 MPa to about 25,000 MPa, and in some embodiments, from about 14,000 MPa to about 22,000 MPa, such as determined in accordance with ISO Test No. 527:2019 at 23° C. Likewise, when subjected to a "ball dent" test as described herein, the polymer composition may exhibit a dent of only about 8 micrometers or less, in some embodiments about 7.5 micrometers or less, in some embodiments from about 1 to about 7 micrometers, and in some embodiments, from about 2 to about 6 micrometers, as determined by dropping a ball having a diameter of 1 mm weight of 20 grams 4,000 times onto a surface of the composition from a height of 1 mm or 0.5 mm. When a ball of a greater weight (e.g., 70 grams) and/or a greater number of drops (e.g., 20,000 times) is employed, the polymer composition may also exhibit a dent within the ranges noted above.

The composition may also exhibit a tensile strength of from about 150 to about 500 MPa, in some embodiments from about 160 to about 400 MPa, and in some embodiments, from about 170 to about 350 MPa and/or a tensile break strain of about 0.5% or more, in some embodiments from about 1% to about 15%, and in some embodiments, from about 2% to about 10%, such as determined in accordance with ISO Test No. 527:2019 at 23° C. The polymer composition may also exhibit a flexural modulus of about 11,000 MPa or more, in some embodiments from about 12,000 MPa to about 30,000 MPa, and in some embodiments, from about 13,000 MPa to about 25,000 MPa; a flexural strength of from about 40 to about 500 MPa, in some embodiments from about 100 to about 400 MPa, and in some embodiments, from about 150 to about 350 MPa; and/or a flexural break strain of about 0.5% or more, in some embodiments from about 1% to about 15%, and in some embodiments, from about 2% to about 10%, such as determined in accordance with ISO Test No. 178:2019 at 23° C. The composition may also exhibit a Charpy unnotched impact strength of about 45 kJ/m$^2$ or more, in some embodiments from about 45 to about 100 kJ/m$^2$, and in some embodiments, from about 50 to about 80 kJ/m$^2$, measured at 23° C. according to ISO Test No. 179-1:2010. Further, the deflection temperature under load (DTUL) of about 180° C.

or more, and in some embodiments, from about 190° C. to about 280° C., as measured according to ASTM D648-18 at a specified load of 1.8 MPa.

Conventionally, it was believed that compositions having excellent mechanical properties would also not possess sufficiently good surface and flow properties to readily enable their use in camera modules. Contrary to conventional thought, however, the present inventor has discovered that the polymer composition of the present invention can still achieve excellent surface and flow properties. The polymer composition may, for instance, exhibit a Rockwell surface hardness of about 65 or less, in some embodiments about 60 or less, and in some embodiments, from about 40 to about 55, as determined in accordance with ASTM D785-08 (2015) (Scale M). Further, the polymer composition may also have a melt viscosity of about 200 Pa-s or less, in some embodiments about 150 Pa-s or less, in some embodiments from about 10 to about 100 Pa-s, and in some embodiments, from about 20 to about 90 Pa-s, determined at a shear rate of 400 seconds$^{-1}$. Melt viscosity may be determined in accordance with ISO Test No. 11443:2014 at a temperature that is 15° C. higher than the melting temperature of the composition (e.g., about 305° C.).

Various embodiments of the present invention will now be described in more detail.

I. Polymer Composition

A. Polymer Matrix

The polymer matrix typically contains one or more liquid crystalline polymers, generally in an amount of from about 50 wt. % to about 90 wt. %, in some embodiments from about 55 wt. % to about 85 wt. %, and in some embodiments, from about 60 wt. % to about 80 wt. % of the entire polymer composition. Particularly suitable are liquid crystalline polymers, which have a high degree of crystallinity that enables them to effectively fill the small spaces of a mold. Liquid crystalline polymers are generally classified as "thermotropic" to the extent that they can possess a rod-like structure and exhibit a crystalline behavior in their molten state (e.g., thermotropic nematic state). The liquid crystalline polymers employed in the polymer composition typically have a melting temperature of about 200° C. or more, in some embodiments from about 220° C. to about 350° C., and in some embodiments, from about 260° C. to about 330° C. The melting temperature may be determined as is well known in the art using differential scanning calorimetry ("DSC"), such as determined by ISO Test No. 11357-3: 2011. Such polymers may be formed from one or more types of repeating units as is known in the art. A liquid crystalline polymer may, for example, contain one or more aromatic ester repeating units generally represented by the following Formula (I):

(I)

wherein, ring B is a substituted or unsubstituted 6-membered aryl group (e.g., 1,4-phenylene or 1,3-phenylene), a substituted or unsubstituted 6-membered aryl group fused to a substituted or unsubstituted 5- or 6-membered aryl group (e.g., 2,6-naphthalene), or a substituted or unsubstituted 6-membered aryl group linked to a substituted or unsubstituted 5- or 6-membered aryl group (e.g., 4,4-biphenylene); and $Y_1$ and $Y_2$ are independently O, C(O), NH, C(O)HN, or NHC(O).

Typically, at least one of $Y_1$ and $Y_2$ are C(O). Examples of such aromatic ester repeating units may include, for instance, aromatic dicarboxylic repeating units ($Y_1$ and $Y_2$ in Formula I are C(O)), aromatic hydroxycarboxylic repeating units ($Y_1$ is O and $Y_2$ is C(O) in Formula I), as well as various combinations thereof.

Aromatic hydroxycarboxylic repeating units, for instance, may be employed that are derived from aromatic hydroxycarboxylic acids, such as, 4-hydroxybenzoic acid; 4-hydroxy-4'-biphenylcarboxylic acid; 2-hydroxy-6-naphthoic acid; 2-hydroxy-5-naphthoic acid; 3-hydroxy-2-naphthoic acid; 2-hydroxy-3-naphthoic acid; 4'-hydroxyphenyl-4-benzoic acid; 3'-hydroxyphenyl-4-benzoic acid; 4'-hydroxyphenyl-3-benzoic acid, etc., as well as alkyl, alkoxy, aryl and halogen substituents thereof, and combination thereof. Particularly suitable aromatic hydroxycarboxylic acids are 4-hydroxybenzoic acid ("HBA") and 6-hydroxy-2-naphthoic acid ("HNA"). When employed, repeating units derived from hydroxycarboxylic acids (e.g., HBA and/or HNA) typically constitute about 30 mol. % or more, in some embodiments from about 40 mol. % to about 80 mol. %, and in some embodiments, from about 50 mol. % to 70 mol. % of the polymer.

Aromatic dicarboxylic repeating units may also be employed that are derived from aromatic dicarboxylic acids, such as terephthalic acid, isophthalic acid, 2,6-naphthalenedicarboxylic acid, diphenyl ether-4,4'-dicarboxylic acid, 1,6-naphthalenedicarboxylic acid, 2,7-naphthalenedicarboxylic acid, 4,4'-dicarboxybiphenyl, bis(4-carboxyphenyl) ether, bis(4-carboxyphenyl)butane, bis(4-carboxyphenyl) ethane, bis(3-carboxyphenyl)ether, bis(3-carboxyphenyl) ethane, etc., as well as alkyl, alkoxy, aryl and halogen substituents thereof, and combinations thereof. Particularly suitable aromatic dicarboxylic acids may include, for instance, terephthalic acid ("TA"), isophthalic acid ("IA"), and 2,6-naphthalenedicarboxylic acid ("NDA"). When employed, repeating units derived from aromatic dicarboxylic acids (e.g., IA, TA, and/or NDA) each typically constitute from about 1 mol. % to about 50 mol. %, in some embodiments from about 2 mol. % to about 40 mol. %, and in some embodiments, from about 5 mol. % to about 30 mol. % of the polymer.

Other repeating units may also be employed in the polymer. In certain embodiments, for instance, repeating units may be employed that are derived from aromatic diols, such as hydroquinone, resorcinol, 2,6-dihydroxynaphthalene, 2,7-dihydroxynaphthalene, 1,6-dihydroxynaphthalene, 4,4'-dihydroxybiphenyl (or 4,4'-biphenol), 3,3'-dihydroxybiphenyl, 3,4'-dihydroxybiphenyl, 4,4'-dihydroxybiphenyl ether, bis(4-hydroxyphenyl)ethane, etc., as well as alkyl, alkoxy, aryl and halogen substituents thereof, and combinations thereof. Particularly suitable aromatic diols may include, for instance, hydroquinone ("HQ") and 4,4'-biphenol ("BP"). When employed, repeating units derived from aromatic diols (e.g., HQ and/or BP) each typically constitute from about 1 mol. % to about 30 mol. %, in some embodiments from about 2 mol. % to about 25 mol. %, and in some embodiments, from about 5 mol. % to about 20 mol. % of the polymer. Repeating units may also be employed, such as those derived from aromatic amides (e.g., acetaminophen ("APAP")) and/or aromatic amines (e.g., 4-aminophenol ("AP"), 3-aminophenol, 1,4-phenylenediamine, 1,3-phenylenediamine, etc.). When employed, repeating units derived from aromatic amides (e.g., APAP) and/or aromatic amines (e.g., AP) typically constitute from about 0.1 mol. % to about 20 mol. %, in some embodiments from about 0.5 mol. % to about 15 mol. %, and in some embodiments, from about 1 mol. % to about 10 mol. % of the polymer. It should also be understood that various other monomeric repeating units may be incorporated into the polymer. For instance, in certain embodiments, the polymer may contain one or more repeating units derived from non-aromatic monomers, such as aliphatic or cycloaliphatic hydroxycarboxylic acids, dicarboxylic acids, diols, amides, amines, etc. Of course, in other embodiments, the polymer may be "wholly aromatic" in that it lacks repeating units derived from non-aromatic (e.g., aliphatic or cycloaliphatic) monomers.

Typically, the liquid crystalline polymer is a "low naphthenic" polymer to the extent that it contains a low content of repeating units derived from naphthenic hydroxycarboxylic acids and naphthenic dicarboxylic acids, such as naphthalene-2,6-dicarboxylic acid ("NDA"), 6-hydroxy-2-naphthoic acid ("HNA"), or combinations thereof. That is, the total amount of repeating units derived from naphthenic hydroxycarboxylic and/or dicarboxylic acids (e.g., NDA, HNA, or a combination of HNA and NDA) is typically about 15 mol. % or less, in some embodiments about 10 mol. % or less, in some embodiments about 6 mol. % or less, and in some embodiments, from 0 mol. % to about 5 mol. % of the polymer. In one embodiment, for instance, the repeating units derived from HNA and/or NDA may be 0 mol. % of the polymer. In such embodiments, the polymer may contain repeating units derived from HBA in an amount of from about 40 mol. % to about 80 mol. %, and in some embodiments from about 45 mol. % to about 75 mol. %, and in some embodiments, from about 50 mol. % to about 70 mol. %. The polymer may also contain aromatic dicarboxylic acid(s) (e.g., IA and/or TA) in an amount of from about 1 mol. % to about 20 mol. %, and in some embodiments, from about 4 mol. % to about 15 mol. %, and/or aromatic diol(s) (e.g., BP and/or HQ) in an amount of from about 1 mol. % to about 20 mol. %, and in some embodiments, from about 4 mol. % to about 15 mol. %. In certain instances, the molar ratio of BP to HQ may be selectively controlled so that it is from about 0.8 to about 2.5, in some embodiments from about 1 to about 2.2, and in some embodiments, from about 1.1 to about 2 and/or the molar ratio of TA to IA may be selectively controlled so that it is from about 0.8 to about 2.5, in some embodiments from about 1 to about 2.2, and in some embodiments, from about 1.1 to about 2. For example, BP may be used in a molar amount greater than HQ such that the molar ratio is greater than 1 and/or TA may be used in a molar amount greater than IA such that the molar ratio is greater than 1.

Although not required in all instances, it is often desired that a substantial portion of the polymer matrix is formed from low naphthenic polymers such as described above. For example, such low naphthenic polymers as described herein typically constitute 50 wt. % or more, in some embodiments about 65 wt. % or more, in some embodiments from about 70 wt. % to 100 wt. %, and in some embodiments, from about 80 wt. % to 100% of the polymer matrix (e.g., 100 wt. %).

B. Silica Particles

As indicated above, the polymer composition contains a plurality of silica particles distributed within the polymer matrix. Such particles typically constitute from about 10 wt. % to about 50 wt. %, in some embodiments from about 12 wt. % to about 40 wt. %, and in some embodiments, from about 15 wt. % to about 30 wt. % of the polymer composition.

The silica particles may possess a variety of different forms and shapes depending upon the desired result. For instance, the particles may be in the shape of a sphere, crystal, rod, disk, tube, string, etc. In one embodiment, for example, the silica particles may be generally spherical in that the aspect ratio (ratio of the median diameter to the thickness) is from about 0.7 to about 1.3, in some embodiments from about 0.8 to about 1.2, in some embodiments from about 0.9 to about 1.1 (e.g., 1). Regardless of their particular shape, however, the silica particles are generally selectively controlled to have a certain a median (D50) diameter, such as about 4 micrometers or less, in some embodiments from about 0.01 to about 3 micrometers, in some embodiments from about 0.05 to about 2 micrometers, and in some embodiments, from about 0.1 to about 1.5 micrometers, such as determined by a laser diffraction particle size analyzer (e.g., Mastersizer 3000). The silica particles may also have a narrow size distribution. That is, at least about 70% by volume of the particles, in some embodiments at least about 80% by volume of the particles, and in some embodiments, at least about 90% by volume of the particles may have a size within the ranges noted above. Furthermore, within the general size ranges noted above, it may sometimes be desirable to employ a blend of silica particles having different sizes to achieve the target properties. For example, fine silica particles may be employed in combination with coarse silica particles having a larger median diameter than the fine particles. The fine particles may, for instance, have a median diameter of about 1.5 micrometers or less, in some embodiments from about 0.1 to about 1.2 micrometers, and in some embodiments, from about 0.2 to about 1 micrometer, while the coarse particles may have a median diameter of about 1.5 micrometers to about 4 micrometers, in some embodiments from about 1.8 to about 3.5 micrometers, and in some embodiments, from about 2 to about 3 micrometers.

The silica particles may also have a controlled specific surface area, such as from about 1 to about 50 square meters per gram ($m^2/g$), in some embodiments from about 2 to about 20 $m^2/g$, and in some embodiments, from about 4 to about 12 $m^2/g$. The term "specific surface area" generally refers to surface area as determined by the physical gas adsorption (B.E.T.) method of Bruanauer, Emmet, and Teller, Journal of American Chemical Society, Vol. 60, 1938, p. 309, with nitrogen as the adsorption gas.

The silica particles may be formed using a variety of different processes, such as a fumed process, precipitation, etc. Due to their higher surface area and smaller particle size, fumed particles are particularly suitable for use in the present invention. Fumed silica, for instance, is amorphous $SiO_2$ that can be produced by vapor phase hydrolysis of silicon tetrachloride in a hydrogen oxygen flame. Three-dimensional branched chain aggregates are produced in the flame from fusion of the primary particles. During cooling, these aggregates agglomerate into a fine powder having a particle size within the ranges noted above. Fumed silica possesses silanol groups that can react under acidic conditions to form a cross-linked network. The resulting siloxane cross-linkage is a compound of silicon and oxygen in which each atom of silicon is bonded to four oxygen atoms, forming a tetrahedral structure, in a manner analogous to the bonding of carbon to hydrogen in methane, the bonds being of about the same strength in each case. This structure is found in the dioxide and in silicates generally, where the SiO$_4$ groups occur in chains or rings. By creating siloxane cross-linkages, a gel is formed that entraps the liquid phase of the electrolyte.

C. Optional Components

One beneficial aspect of the present invention is that a combination of good mechanical properties may be achieved without adversely impacting other properties, such as flowability and surface characteristics. To help ensure that these properties are maintained, it is generally desirable that the polymer composition remains generally free of certain conventional strength-enhancing additives, such as fibrous fillers (e.g., glass fibers), mineral fillers, and impact modifiers. For example, if employed at all, such component(s) typically constitute less than about 10 wt. %, in some embodiments less than about 5 wt. %, and in some embodiments, from about 0.001 wt. % to about 3 wt. % of the polymer composition.

Nevertheless, in some cases, it may be desired to employ such components in the polymer composition. Suitable mineral fillers may include, for instance, mineral particles, mineral fibers (or "whiskers"), etc., as well as blends thereof. Typically, the mineral filler has a certain hardness value to help improve the mechanical strength, adhesive strength, and surface properties of the composition, which enables the composition to be uniquely suited to form the small parts of a camera module. For instance, the hardness values may be about 2.0 or more, in some embodiments about 2.5 or more, in some embodiments about 3.0 or more, in some embodiments from about 3.0 to about 11.0, in some embodiments from about 3.5 to about 11.0, and in some embodiments, from about 4.5 to about 6.5 based on the Mohs hardness scale. Any of a variety of different types of mineral particles may generally be employed, such as those formed from a natural and/or synthetic silicate mineral, such as talc, mica, halloysite, kaolinite, illite, montmorillonite, vermiculite, palygorskite, pyrophyllite, calcium silicate, aluminum silicate, wollastonite, etc.; sulfates; carbonates; phosphates; fluorides, borates; and so forth. Particularly suitable are particles having the desired hardness value, such as calcium carbonate (CaCO$_3$, Mohs hardness of 3.0), copper carbonate hydroxide (Cu$_2$CO$_3$(OH)$_2$, Mohs hardness of 4.0); calcium fluoride (CaFl$_2$, Mohs hardness of 4.0); calcium pyrophosphate ((Ca$_2$P$_2$O$_7$, Mohs hardness of 5.0), anhydrous dicalcium phosphate (CaHPO$_4$, Mohs hardness of 3.5), hydrated aluminum phosphate (AlPO$_4$·2H$_2$O, Mohs hardness of 4.5); potassium aluminum silicate (KAlSi$_3$O$_8$, Mohs hardness of 6), copper silicate (CuSiO$_3$·H$_2$O, Mohs hardness of 5.0); calcium borosilicate hydroxide (Ca$_2$B$_5$SiO$_9$(OH)$_5$, Mohs hardness of 3.5); calcium sulfate (CaSO$_4$, Mohs hardness of 3.5), barium sulfate (BaSO$_4$, Mohs hardness of from 3 to 3.5), mica (Mohs hardness of 2.5-5.3), and so forth, as well as combinations thereof. Mica, for instance, is particularly suitable. Any form of mica may generally be employed, including, for instance, muscovite (KAl$_2$(AlSi$_3$)O$_{10}$(OH)$_2$), biotite (K(Mg,Fe)$_3$(AlSi$_3$)O$_{10}$(OH)$_2$), phlogopite (KMg$_3$(AlSi$_3$)O$_{10}$(OH)$_2$), lepidolite (K(Li,Al)$_{2-3}$(AlSi$_3$)O$_{10}$(OH)$_2$), glauconite (K,Na)(Al,Mg,Fe)$_2$(Si,Al)$_4$O$_{10}$(OH)$_2$), etc. Muscovite-based mica is particularly suitable for use in the polymer composition.

In certain embodiments, the mineral particles, such as barium sulfate and/or calcium sulfate particles, may have a shape that is generally granular or nodular in nature. In such embodiments, the particles may have a median size (e.g., diameter) of from about 0.5 to about 20 micrometers, in some embodiments from about 1 to about 15 micrometers, in some embodiments from about 1.5 to about 10 micrometers, and in some embodiments, from about 2 to about 8 micrometers, such as determined using laser diffraction techniques in accordance with ISO 13320:2009 (e.g., with a Horiba LA-960 particle size distribution analyzer). In other embodiments, it may also be desirable to employ flake-shaped mineral particles, such as mica particles, that have a relatively high aspect ratio (e.g., average diameter divided by average thickness), such as about 4 or more, in some embodiments about 8 or more, and in some embodiments, from about 10 to about 500. In such embodiments, the average diameter of the particles may, for example, range from about 5 micrometers to about 200 micrometers, in some embodiments from about 8 micrometers to about 150 micrometers, and in some embodiments, from about 10 micrometers to about 100 micrometers. The average thickness may likewise be about 2 micrometers or less, in some embodiments from about 5 nanometers to about 1 micrometer, and in some embodiments, from about 20 nanometers to about 500 nanometers such as determined using laser diffraction techniques in accordance with ISO 13320:2009 (e.g., with a Horiba LA-960 particle size distribution analyzer).

Suitable mineral fibers may likewise include those that are derived from silicates, such as neosilicates, sorosilicates, inosilicates (e.g., calcium inosilicates, such as wollastonite; calcium magnesium inosilicates, such as tremolite; calcium magnesium iron inosilicates, such as actinolite; magnesium iron inosilicates, such as anthophyllite; etc.), phyllosilicates (e.g., aluminum phyllosilicates, such as palygorskite), tectosilicates, etc.; sulfates, such as calcium sulfates (e.g., dehydrated or anhydrous gypsum); mineral wools (e.g., rock or slag wool); and so forth. Particularly suitable are fibers having the desired hardness value, including fibers derived from inosilicates, such as wollastonite (Mohs hardness of 4.5 to 5.0), which are commercially available from Nyco Minerals under the trade designation Nyglos® (e.g., Nyglos® 4W or Nyglos® 8). The mineral fibers may have a median width (e.g., diameter) of from about 1 to about 35 micrometers, in some embodiments from about 2 to about 20 micrometers, in some embodiments from about 3 to about 15 micrometers, and in some embodiments, from about 7 to about 12 micrometers. In addition to possessing the size characteristics noted above, the mineral fibers may also have a relatively high aspect ratio (average length divided by median width) to help further improve the mechanical properties and surface quality of the resulting polymer composition. For example, the mineral fibers may have an aspect ratio of from about 2 to about 100, in some embodiments from about 2 to about 50, in some embodiments from about 3 to about 20, and in some embodiments, from about 4 to about 15. The volume average length of such mineral fibers may, for example, range from about 1 to about 200 micrometers, in some embodiments from about 2 to about 150 micrometers, in some embodiments from about 5 to about 100 micrometers, and in some embodiments, from about 10 to about 50 micrometers.

Suitable impact modifiers may likewise include polymers that contain an olefinic monomeric unit that derived from one or more α-olefins. Examples of such monomers include, for instance, linear and/or branched α-olefins having from 2 to 20 carbon atoms and typically from 2 to 8 carbon atoms. Specific examples include ethylene, propylene, 1-butene; 3-methyl-1-butene; 3,3-dimethyl-1-butene; 1-pentene; 1-pentene with one or more methyl, ethyl or propyl substituents; 1-hexene with one or more methyl, ethyl or propyl substituents; 1-heptene with one or more methyl, ethyl or propyl substituents; 1-octene with one or more methyl, ethyl or propyl substituents; 1-nonene with one or more methyl, ethyl or propyl substituents; ethyl, methyl or dimethyl-substituted 1-decene; 1-dodecene; and styrene. Particularly desired α-olefin monomers are ethylene and propylene. The olefin polymer may be in the form of a copolymer that contains other monomeric units as known in the art. For example, another suitable monomer may include a "(meth) acrylic" monomer, which includes acrylic and methacrylic monomers, as well as salts or esters thereof, such as acrylate and methacrylate monomers. Examples of such (meth) acrylic monomers may include methyl acrylate, ethyl acrylate, n-propyl acrylate, i-propyl acrylate, n-butyl acrylate, s-butyl acrylate, i-butyl acrylate, t-butyl acrylate, n-amyl acrylate, i-amyl acrylate, isobornyl acrylate, n-hexyl acrylate, 2-ethylbutyl acrylate, 2-ethylhexyl acrylate, n-octyl acrylate, n-decyl acrylate, methylcyclohexyl acrylate, cyclopentyl acrylate, cyclohexyl acrylate, methyl methacrylate, ethyl methacrylate, 2-hydroxyethyl methacrylate, n-propyl methacrylate, n-butyl methacrylate, i-propyl methacrylate, i-butyl methacrylate, n-amyl methacrylate, n-hexyl methacrylate, i-amyl methacrylate, s-butyl-methacrylate, t-butyl methacrylate, 2-ethylbutyl methacrylate, methylcyclohexyl methacrylate, cinnamyl methacrylate, crotyl methacrylate, cyclohexyl methacrylate, cyclopentyl methacrylate, 2-ethoxyethyl methacrylate, isobornyl methacrylate, etc., as well as combinations thereof. In one embodiment, for instance, the impact modifier may be an ethylene methacrylic acid copolymer ("EMAC"). When employed, the relative portion of the monomeric component(s) may be selectively controlled. The α-olefin monomer(s) may, for instance, constitute from about 55 wt. % to about 95 wt. %, in some embodiments from about 60 wt. % to about 90 wt. %, and in some embodiments, from about 65 wt. % to about 85 wt. % of the copolymer. Other monomeric components (e.g., (meth)acrylic monomers) may constitute from about 5 wt. % to about 35 wt. %, in some embodiments from about 10 wt. % to about 32 wt. %, and in some embodiments, from about 15 wt. % to about 30 wt. % of the copolymer.

Other suitable suitable olefin copolymers may be those that are "epoxy-functionalized" in that they contain, on average, two or more epoxy functional groups per molecule. The copolymer may also contain an epoxy-functional monomeric unit. One example of such a unit is an epoxy-functional (meth)acrylic monomer component. For example, suitable epoxy-functional (meth)acrylic monomers may include, but are not limited to, those containing 1,2-epoxy groups, such as glycidyl acrylate and glycidyl methacrylate. Other suitable epoxy-functional monomers include allyl glycidyl ether, glycidyl ethylacrylate, and glycidyl itoconate. Other suitable monomers may also be employed to help achieve the desired molecular weight. In one particular embodiment, for example, the copolymer may be a terpolymer formed from an epoxy-functional (meth)acrylic monomeric component, α-olefin monomeric component, and non-epoxy functional (meth)acrylic monomeric component. The copolymer may, for instance, be poly(ethylene-co-butylacrylate-co-glycidyl methacrylate). When employed, the epoxy-functional (meth)acrylic monomer(s) typically constitutes from about 1 wt. % to about 20 wt. %, in some embodiments from about 2 wt. % to about 15 wt. %, and in some embodiments, from about 3 wt. % to about 10 wt. % of the copolymer.

A wide variety of additional additives can also be included in the polymer composition, such as lubricants, thermally conductive fillers, pigments, antioxidants, stabilizers, surfactants, waxes, flame retardants, anti-drip additives, nucleating agents (e.g., boron nitride), anti-static agents, tribological compounds, and other materials added to enhance properties and processability. Lubricants, for example, may be employed in the polymer composition that are capable of withstanding the processing conditions of the liquid crystalline polymer without substantial decomposition. Examples of such lubricants include fatty acids esters, the salts thereof, esters, fatty acid amides, organic phosphate esters, and hydrocarbon waxes of the type commonly used as lubricants in the processing of engineering plastic materials, including mixtures thereof. Suitable fatty acids typically have a backbone carbon chain of from about 12 to about 60 carbon atoms, such as myristic acid, palmitic acid, stearic acid, arachic acid, montanic acid, octadecinic acid, parinric acid, and so forth. Suitable esters include fatty acid esters, fatty alcohol esters, wax esters, glycerol esters, glycol esters and complex esters. Fatty acid amides include fatty primary amides, fatty secondary amides, methylene and ethylene bisamides and alkanolamides such as, for example, palmitic acid amide, stearic acid amide, oleic acid amide, N,N'-ethylenebisstearamide and so forth. Also suitable are the metal salts of fatty acids such as calcium stearate, zinc stearate, magnesium stearate, and so forth; hydrocarbon waxes, including paraffin waxes, polyolefin and oxidized polyolefin waxes, and microcrystalline waxes. Particularly suitable lubricants are acids, salts, or amides of stearic acid, such as pentaerythritol tetrastearate, calcium stearate, or N,N'-ethylenebisstearamide. When employed, the lubricant(s) typically constitute from about 0.05 wt. % to about 1.5 wt. %, and in some embodiments, from about 0.1 wt. % to about 0.5 wt. % (by weight) of the polymer composition.

II. Formation

The components of the polymer composition (e.g., liquid crystalline polymer(s), silica particles, etc.) may be melt processed or blended together. The components may be supplied separately or in combination to an extruder that includes at least one screw rotatably mounted and received within a barrel (e.g., cylindrical barrel) and may define a feed section and a melting section located downstream from the feed section along the length of the screw. The extruder may be a single screw or twin screw extruder. The speed of the screw may be selected to achieve the desired residence time, shear rate, melt processing temperature, etc. For example, the screw speed may range from about 50 to about 800 revolutions per minute ("rpm"), in some embodiments from about 70 to about 150 rpm, and in some embodiments, from about 80 to about 120 rpm. The apparent shear rate during melt blending may also range from about 100 seconds$^{-1}$ to about 10,000 seconds$^{-1}$, in some embodiments from about 500 seconds$^{-1}$ to about 5000 seconds$^{-1}$, and in some embodiments, from about 800 seconds$^{-1}$ to about 1200 seconds$^{-1}$. The apparent shear rate is equal to $4Q/\pi R^3$, where Q is the volumetric flow rate ("m$^3$/s") of the polymer melt and R is the radius ("m") of the capillary (e.g., extruder die) through which the melted polymer flows.

III. Camera Module

As indicated above, the polymer composition of the present invention may be employed in a camera module. Typically, the camera module includes a housing which a lens module is positioned that contains one or more lenses. However, the particular configuration of the camera module may vary as is known to those skilled in the art.

Figure 1:
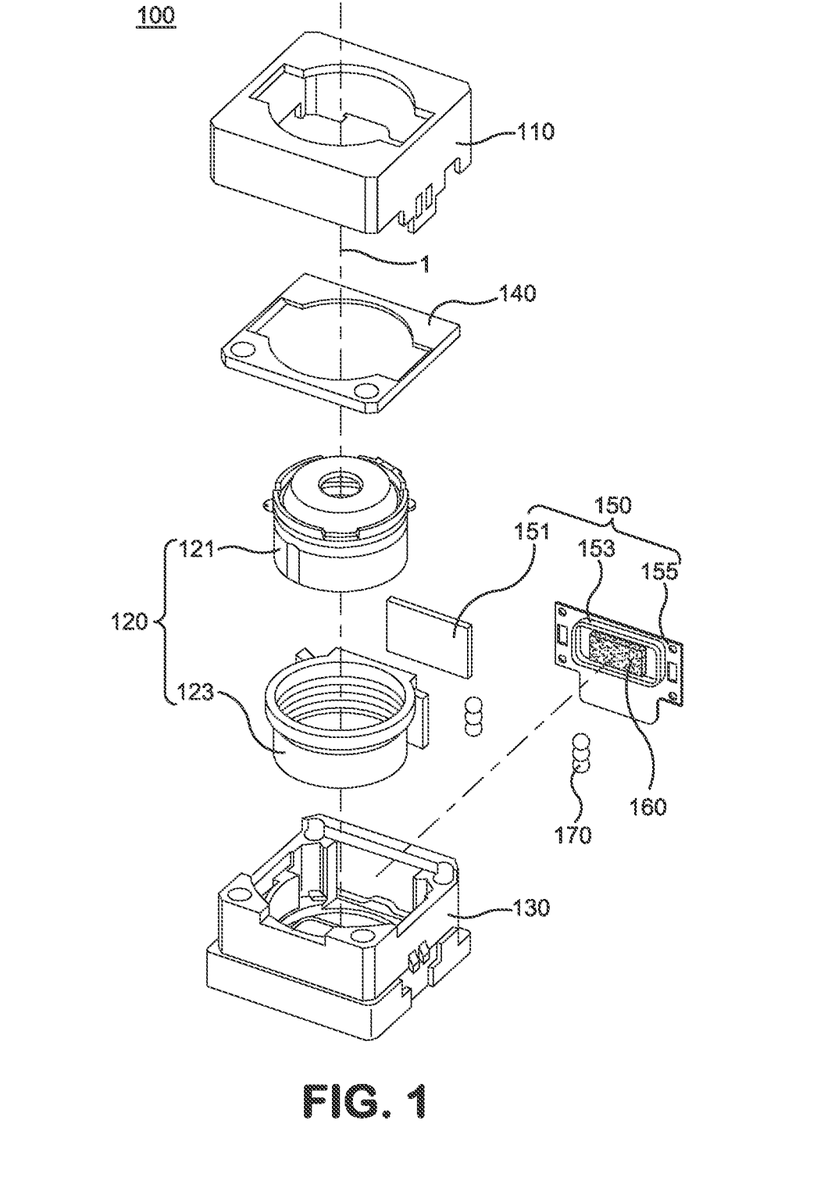
FIG. 1 is a perspective view of a camera module that may be formed in accordance with one embodiment of the present invention.

Referring to FIG. 1, for example, one embodiment of a camera module 100 is shown that contains a lens module 120 that is contained within a housing, wherein the lens module 120 contains a lens barrel 121 coupled to a lens holder 123. The lens barrel 121 may have a hollow cylindrical shape so that a plurality of lenses for imaging an object may be accommodated therein in an optical axis direction 1. The lens barrel 121 may be inserted into a hollow cavity provided in the lens holder 123, and the lens barrel 121 and the lens holder 123 may be coupled to each other by a fastener (e.g., screw), adhesive, etc. The lens module 120, including the lens barrel 121, may be moveable in in the optical axis direction 1 (e.g., for auto-focusing) by an actuator assembly 150. In the illustrated embodiment, for example, the actuator assembly 150 may include a magnetic body 151 and a coil 153 configured to move the lens module 120 in the optical axis direction 1. The magnetic body 151 may be mounted on one side of the lens holder 123, and the coil 153 may be disposed to face the magnetic body 151. The coil 153 may be mounted on a substrate 155, which is in turn may be mounted to the housing 130 so that the coil 153 faces the magnetic body 151. The actuator assembly 150 may include a drive device 160 that is mounted on the substrate 155 and that outputs a signal (e.g., current) for driving the actuator assembly 150 depending on a control input signal. The actuator assembly 150 may receive the signal and generate a driving force that moves the lens module 120 in the optical axis direction 1. If desired, a stopper 140 may also be mounted on the housing 130 to limit a moving distance of the lens module 120 in the optical axis direction 1. Further, a shield case 110 (e.g., metal) may also be coupled to the housing 130 to enclose outer surfaces of the housing 130, and thus block electromagnetic waves generated during driving of the camera module 100.

The actuator assembly may also include a guide unit that is positioned between the housing and the lens module to help guide the movement of the lens module. Any of a variety of guide units may be employed as known in the art, such as spring(s), ball bearing(s), electrostatic force generators, hydraulic force generators, etc. For example, springs can be employed that generate a preload force that acts on the lens module and guides it into the desired optical axis direction. Alternatively, as illustrated in the embodiment shown in FIG. 1, ball bearings 170 may act as a guide unit of the actuator assembly 150. More specifically, the ball bearings 170 may contact an outer surface of the lens holder 123 and an inner surface of the housing 130 to guide the movement of the lens module 120 in the optical axis direction 1. That is, the ball bearings 170 may be disposed between the lens holder 123 and the housing 130, and may guide the movement of the lens module 120 in the optical axis direction through a rolling motion. Any number of ball bearings 170 may generally be employed for this purpose, such as 2 or more, in some embodiments from 3 to 20, and in some embodiments, from 4 to 12. The ball bearings 170 may be spaced part or in contact with each other, and may also be stacked in a direction perpendicular to the optical axis direction 1. The size of the ball bearings 170 may vary as is known to those skilled in the art. For instance, the ball bearings may have an average size (e.g., diameter) of about 800 micrometers or less, in some embodiments about 600 micrometers or less, in some embodiments about 400 micrometers or less, and in some embodiments, from about 50 to about 200 micrometers.

Notably, the polymer composition of the present invention may be employed in any of a variety of parts of the camera module. Referring again to FIG. 1, for instance, the polymer composition may be used to form all or a portion of the guide unit (e.g., ball bearings 170), housing 130, lens barrel 121, lens holder 123, substrate 155, stopper 140, shield case 110, and/or any other portion of the camera module. Regardless, the desired part(s) may be formed using a variety of different techniques. Suitable techniques may include, for instance, injection molding, low-pressure injection molding, extrusion compression molding, gas injection molding, foam injection molding, low-pressure gas injection molding, low-pressure foam injection molding, gas extrusion compression molding, foam extrusion compression molding, extrusion molding, foam extrusion molding, compression molding, foam compression molding, gas compression molding, etc. For example, an injection molding system may be employed that includes a mold within which the polymer composition may be injected. The time inside the injector may be controlled and optimized so that polymer matrix is not pre-solidified. When the cycle time is reached and the barrel is full for discharge, a piston may be used to inject the composition to the mold cavity. Compression molding systems may also be employed. As with injection molding, the shaping of the polymer composition into the desired article also occurs within a mold. The composition may be placed into the compression mold using any known technique, such as by being picked up by an automated robot arm. The temperature of the mold may be maintained at or above the solidification temperature of the polymer matrix for a desired time period to allow for solidification. The molded product may then be solidified by bringing it to a temperature below that of the melting temperature. The resulting product may be de-molded. The cycle time for each molding process may be adjusted to suit the polymer matrix, to achieve sufficient bonding, and to enhance overall process productivity.

Figure 2:
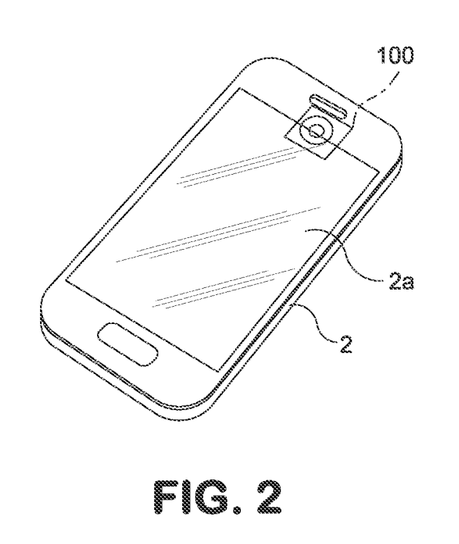
FIG. 2 is a top perspective view of one embodiment of an electronic device containing the camera module of the present invention.
Figure 3:
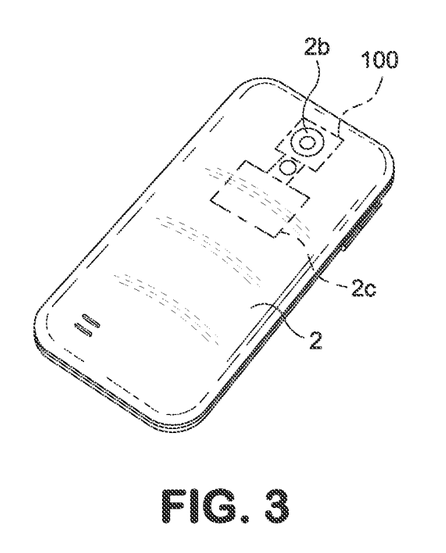
FIG. 3 is a bottom perspective view of the electronic device shown in FIG. 2.

The resulting camera module may be used in a wide variety of electronic devices as is known in the art, such as in portable electronic devices (e.g., mobile phones, portable computers, tablets, watches, etc.), computers, televisions, automotive parts, etc. In one particular embodiment, the polymer composition may be employed in a camera module, such as those commonly employed in wireless communication devices (e.g., cellular telephone). Referring to FIGS. 2-3, for example, one embodiment of an electronic device 2 (e.g., phone) is shown that includes a camera module 100. As illustrated, a lens of the camera module 100 may be exposed to the outside of the electronic device 2 through an opening 2b to image an external object. The camera module 100 may also be electrically connected to an application integrated circuit 2c to perform a control operation depending on selection of a user.

The present invention may be better understood with reference to the following examples.

Test Methods

Melt Viscosity: The melt viscosity (Pa-s) may be determined in accordance with ISO Test No. 11443:2014 at a shear rate of 1,000 s$^{-1}$ and temperature 15° C. above the melting temperature using a Dynisco LCR7001 capillary rheometer. The rheometer orifice (die) had a diameter of 1 mm, length of 20 mm, L/D ratio of 20.1, and an entrance angle of 180°. The diameter of the barrel was 9.55 mm+0.005 mm and the length of the rod was 233.4 mm.

Melting Temperature: The melting temperature ("Tm") may be determined by differential scanning calorimetry ("DSC") as is known in the art. The melting temperature is the differential scanning calorimetry (DSC) peak melt temperature as determined by ISO Test No. 11357-2:2020. Under the DSC procedure, samples were heated and cooled at 20° C. per minute as stated in ISO Standard 10350 using DSC measurements conducted on a TA Q2000 Instrument.

Deflection Temperature Under Load ("DTUL"): The deflection under load temperature may be determined in accordance with ISO Test No. 75-2:2013 (technically equivalent to ASTM D648-18). More particularly, a test strip sample having a length of 80 mm, thickness of 10 mm, and width of 4 mm may be subjected to an edgewise three-point bending test in which the specified load (maximum outer fibers stress) was 1.8 Megapascals. The specimen may be lowered into a silicone oil bath where the temperature is raised at 2° C. per minute until it deflects 0.25 mm (0.32 mm for ISO Test No. 75-2:2013).

Tensile Modulus, Tensile Stress, and Tensile Elongation: Tensile properties may be tested according to ISO Test No. 527:2019 (technically equivalent to ASTM D638-14). Modulus and strength measurements may be made on the same test strip sample having a length of 80 mm, thickness of 10 mm, and width of 4 mm. The testing temperature may be 23° C., and the testing speeds may be 1 or 5 mm/min.

Flexural Modulus, Flexural Stress, and Flexural Elongation: Flexural properties may be tested according to ISO Test No. 178:2019 (technically equivalent to ASTM D790-10). This test may be performed on a 64 mm support span. Tests may be run on the center portions of uncut ISO 3167 multi-purpose bars. The testing temperature may be 23° C. and the testing speed may be 2 mm/min.

Charpy Impact Strength: Charpy properties may be tested according to ISO Test No. ISO 179-1:2010) (technically equivalent to ASTM D256-10, Method B). This test may be run using a Type 1 specimen size (length of 80 mm, width of 10 mm, and thickness of 4 mm). When testing the notched impact strength, the notch may be a Type A notch (0.25 mm base radius). Specimens may be cut from the center of a multi-purpose bar using a single tooth milling machine. The testing temperature may be 23° C.

Rockwell Hardness: Rockwell hardness is a measure of the indentation resistance of a material and may be determined in accordance with ASTM D785-08 (Scale M). Testing is performed by first forcing a steel ball indentor into the surface of a material using a specified minor load. The load is then increased to a specified major load and decreased back to the original minor load. The Rockwell hardness is a measure of the net increase in depth of the indentor, and is calculated by subtracting the penetration divided by the scale division from 130.

Ball Dent Test: To test the ability of a material to withstand a physical force, a "ball dent" test may be performed. More particularly, a sample composition may be injection molded into a plate having a width and length of 40 mm and a thickness of 0.23 mm. Once formed, a ceramic ball (1 mm diameter) may be dropped numerous times (e.g., 4,000 or 20,000 times) from a distance of 0.5 mm or 1 mm from the upper surface of the specimen. Various weights may be added on top of the ball, such as 20 grams or 70 grams. After the ball has contacted the specimen, the depth and diameter of any dent formed in the specimen is measured using an image measurement sensor from Keyence.

COMPARATIVE EXAMPLE 1

Sample 1 is formed from 57.5 wt. % LCP 1, 12.5 wt. % of an LCP color masterbatch, 20 wt. % Silica 1 (amorphous silica with median particle size of 2.3 μm), and 10 wt. % wollastonite fibers (Nyglos™ 4W). LCP 1 is formed from about 60% HBA, 13% TA, 12% BP, 8% HQ, and 7% IA.

Example 1-4

Samples 1-4 are formed from various percentages of LCP 1, color masterbatch, Silica 1, Silica 2 (amorphous silica with median particle size of 0.7 μm), and a lubricant.

TABLE 1

| Sample | 1 | 2 | 3 | 4 |
|---|---|---|---|---|
| LCP 1 | 65 | 74.7 | 74.7 | 74.7 |
| LCP Color Masterbatch | 5 | 5 | 5 | 5 |
| Silica 1 | — | — | 15 | — |
| Silica 2 | 30 | 25 | 5 | 20 |
| Lubricant | — | 0.3 | 0.3 | 0.3 |

Parts are injection molded from the samples of Comparative Example 1 and Examples 1-4 into plaques (60 mm×60 mm) and tested for mechanical properties. The results are set forth below in Table 2.

TABLE 2

| Sample | Comp. Ex. 1 | 1 | 2 | 3 | 4 |
|---|---|---|---|---|---|
| Melt Viscosity (Pa-s) at 400 $s^{-1}$) | 42 | 57 | 53 | 20 | 32 |
| DTUL at 1.8 MPa (° C.) | — | 205 | 209 | 211 | 217 |
| Charpy Unnotched (kJ/$m^2$) | 41 | 45 | 58 | 47 | 61 |
| Rockwell Surface Hardness (M-scale) | 67 | 51 | 53 | 54 | 57 |
| Tensile Strength (MPa) | 142 | 133 | 177 | 172 | 215 |
| Tensile Modulus (MPa) | 10,300 | 13,904 | 14,215 | 14,962 | 18,277 |
| Tensile Elongation (%) | 5.24 | 1.53 | 2.34 | 2.15 | 2.08 |
| Flexural Strength (MPa) | 163 | 160 | 161 | 161 | 172 |
| Flexural Modulus (MPa) | 10,320 | 13,439 | 13,358 | 13,207 | 15,157 |
| Flexural Elongation (%) | — | 2.46 | 2.62 | 3.22 | 2.92 |
| Avg. Ball Dents (20 g, 1 mm, 4,000 times) (depth, μm) | 9.1 | 6.5 | 5.8 | 5.0 | 5.6 |
| Avg. Ball Dents (70 g, 0.5 mm, 20,000 times) (depth, μm) | 10.6 | 5.5 | 4.8 | — | — |

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:
1. A polymer composition comprising:
from about 50 wt. % to about 90 wt. % of a polymer matrix that includes a liquid crystalline polymer containing repeating units derived from naphthenic hydroxycarboxylic and/or dicarboxylic acids in an amount of about 15 mol. % or less of the polymer; and
from about 10 wt. % to 25 wt. % of silica particles distributed within the polymer matrix, wherein the silica particles have a median particle size of about 4 micrometers or less and include fine particles having a median diameter of about 1.5 micrometers or less, wherein the silica particles contain a blend of fine silica particles and coarse silica particles, wherein the coarse silica particles have a median diameter greater than the fine silica particles;
wherein the polymer composition exhibits a tensile modulus of 11,000 MPa or more as determined in accordance with ISO Test No. 527:2019.
2. The polymer composition of claim 1, wherein the fine silica particles have a median diameter of from about 0.1 to about 1.2 micrometers and the coarse silica particles have a median diameter of from about 1.8 to about 3.5 micrometers.

3. A polymer composition comprising:
   from about 50 wt. % to about 90 wt. % of a polymer matrix that includes a liquid crystalline polymer containing repeating units derived from naphthenic hydroxycarboxylic and/or dicarboxylic acids in an amount of about 15 mol. % or less of the polymer; and
   from about 10 wt. % to about 50 wt. % of silica particles distributed within the polymer matrix, wherein the silica particles have a median particle size of about 4 micrometers or less, wherein the silica particles contain a blend of fine silica particles and coarse silica particles, wherein the coarse silica particles have a median diameter greater than the fine silica particles;
   wherein the polymer composition exhibits a tensile modulus of 11,000 MPa or more as determined in accordance with ISO Test No. 527:2019.

4. The polymer composition of claim 3, wherein the polymer composition exhibits a dent of about 8 micrometers or less when contacted with a ball having a diameter of 1 mm and weight of 20 grams that is dropped 4,000 times from a height of 1 millimeter into contact with the polymer composition.

5. The polymer composition of claim 3, wherein the polymer composition exhibits a dent of about 8 micrometers or less when contacted with a ball having a diameter of 1 mm and weight of 70 grams that is dropped 20,000 times from a height of 1 millimeter into contact with the polymer composition.

6. The polymer composition of claim 3, wherein the polymer composition exhibits a melt viscosity of 200 Pa-s or less as determined at a shear rate of 400 seconds$^{-1}$ and at a temperature 15° C. higher than the melting temperature of the composition in accordance with ISO Test No. 11443:2014.

7. The polymer composition of claim 3, wherein the polymer composition exhibits a flexural modulus of about 11,000 MPa or more as determined in accordance with ISO Test No. 178:2019 at 23° C.

8. The polymer composition of claim 3, wherein the polymer composition exhibits a Rockwell surface hardness of about 65 or less as determined in accordance with ASTM D785-08 (Scale M).

9. The polymer composition of claim 3, wherein the polymer composition exhibits a Charpy unnotched impact strength of about 45 KJ/m$^2$ or more as determined at 23° C. according to ISO Test No. 179-1:2010.

10. The polymer composition of claim 3, wherein the polymer composition exhibits a tensile strength of from about 150 to about 500 MPa as determined in accordance with ISO Test No. 527:2019.

11. The polymer composition of claim 3, wherein the liquid crystalline polymer has a melting temperature of about 200° C. or more.

12. The polymer composition of claim 3, wherein the liquid crystalline polymer contains one or more repeating units derived from a hydroxycarboxylic acid, wherein the hydroxycarboxylic acid repeating units constitute from about 50 mol. % to about 70 mol. % of the polymer.

13. The polymer composition of claim 12, wherein the liquid crystalline polymer contains repeating units derived from 4-hydroxybenzoic acid.

14. The polymer composition of claim 13, wherein the liquid crystalline polymer further contains repeating units derived from terephthalic acid, isophthalic acid, hydroquinone, and 4,4'-biphenol.

15. The polymer composition of claim 14, wherein the molar amount of 4,4'-biphenol is greater than the molar amount of hydroquinone and/or the molar amount of terephthalic acid is greater than the molar amount of isophthalic acid.

16. The polymer composition of claim 3, wherein the silica particles are generally spherical.

17. The polymer composition of claim 3, wherein the silica particles contain amorphous silica.

18. The polymer composition of claim 3, wherein the silica particles have a median diameter of from about 0.1 to about 1.5 micrometers.

19. The polymer composition of claim 3, wherein the silica particles have a specific surface area of from about 1 to about 50 meters squared per gram.

20. The polymer composition of claim 3, wherein the polymer composition is generally free of glass fibers.

21. The polymer composition of claim 3, wherein the polymer composition is generally free of an impact modifier.

22. The polymer composition of claim 3, wherein the polymer composition is generally free of mineral fibers.

23. A camera module comprising the polymer composition of claim 3.

24. The camera module of claim 23, wherein the camera module comprises:
   a housing within which a lens module is positioned that contains one or more lenses; and
   optionally, an actuator assembly that is configured to drive the lens module in an optical axis direction;
   wherein at least a portion of the housing, lens module, actuator assembly, or a combination thereof contains the polymer composition.

25. The polymer composition of claim 24, wherein the actuator assembly optionally includes a guide unit that is positioned between the housing and the lens module, wherein the guide unit includes a spring, ball bearing, electrostatic force generator, hydraulic force generator, or a combination thereof.

26. The polymer composition of claim 25, wherein at least a portion of the guide unit contains the polymer composition.

27. The polymer composition of claim 25, wherein the guide unit contains a ball bearing.

28. The polymer composition of claim 27, wherein the ball bearing has an average size of about 800 micrometers or less.

29. An electronic device comprising the polymer composition of claim 3.

30. The electronic device of claim 29, wherein the device is a wireless communication device.

* * * * *